United States Patent
Mattson, Jr. et al.

(10) Patent No.: US 9,870,324 B2
(45) Date of Patent: Jan. 16, 2018

(54) ISOLATING GUEST CODE AND DATA USING MULTIPLE NESTED PAGE TABLES

(71) Applicant: VMWARE, INC., Palo Alto, CA (US)

(72) Inventors: James S. Mattson, Jr., Palo Alto, CA (US); Rakesh Agarwal, Palo Alto, CA (US); Alok Nemchand Kataria, Pune (IN); Wei Xu, Palo Alto, CA (US); Frederick Joseph Jacobs, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/798,483

(22) Filed: Jul. 14, 2015

(65) Prior Publication Data

US 2016/0299851 A1 Oct. 13, 2016

(30) Foreign Application Priority Data

Apr. 9, 2015 (IN) .......................... 1861/CHE/2015

(51) Int. Cl.
*G06F 12/08* (2016.01)
*G06F 12/14* (2006.01)

(52) U.S. Cl.
CPC .... *G06F 12/145* (2013.01); *G06F 2212/1052* (2013.01); *G06F 2212/151* (2013.01)

(58) Field of Classification Search
CPC .............. G06F 12/1027; G06F 12/1036; G06F 12/1054; G06F 2212/652
See application file for complete search history.

(56) References Cited

U.S. PATENT DOCUMENTS

| | | | |
|---|---|---|---|
| 2009/0113110 A1* | 4/2009 | Chen .................... | G06F 9/4426 711/6 |
| 2010/0088474 A1 | 4/2010 | Agesen | |
| 2012/0110348 A1* | 5/2012 | Hofstee .............. | G06F 12/1408 713/190 |
| 2013/0007325 A1* | 1/2013 | Sahita .................... | G06F 13/24 710/267 |
| 2013/0159726 A1 | 6/2013 | McKeen et al. | |
| 2013/0227248 A1* | 8/2013 | Mehta ................. | G06F 12/1027 711/207 |
| 2015/0121354 A1* | 4/2015 | Gschwind ........... | G06F 9/30134 717/157 |

(Continued)

OTHER PUBLICATIONS

International Search Report dated Jun. 21, 2016 in PCT Application PCT/US2016/026164.

*Primary Examiner* — Ryan Bertram
*Assistant Examiner* — Trang Ta (57) ABSTRACT

A hypervisor provides a guest operating system with a plurality of protection domains, including a root protection domain and one or more secure protection domains, and mechanisms for controlling the transitions between the protection domains. The guest physical memory region of a secure protection domain, which is mapped to host physical memory by secure nested page tables, stores secure guest code and data, and guest page tables for the secure guest code. When executing secure guest code, the guest page tables stored in the secure protection domain region are used for guest virtual to guest physical address translations, and the secure nested page tables are used for guest physical to host physical address translations.

20 Claims, 6 Drawing Sheets

(56) References Cited

U.S. PATENT DOCUMENTS

2016/0048464 A1* 2/2016 Nakajima ........... G06F 12/1475
                                                711/152
2016/0132349 A1* 5/2016 Bacher ................ G06F 9/45545
                                                718/1

* cited by examiner

ISOLATING GUEST CODE AND DATA USING MULTIPLE NESTED PAGE TABLES

RELATED APPLICATIONS

Benefit is claimed under 35 U.S.C. 119(a)-(d) to Foreign application Serial No. 1861/CHE/2015 filed in India entitled "ISOLATING GUEST CODE AND DATA USING MULTIPLE NESTED PAGE TABLES", on Apr. 9, 2015, by VMware, Inc., which is herein incorporated in its entirety by reference for all purposes.

BACKGROUND

Virtual machine (VM) systems provide a guest operating system (OS) with a virtual execution platform comprising virtual hardware subsystems configured to emulate corresponding physical hardware subsystems. An instance of the virtual execution platform configured to execute the guest OS is commonly referred to as a virtual machine (VM). In a typical VM system, an arbitrary number of VMs may execute on a single physical host machine (or more simply, "host"). Each VM may operate independently with respect to other VMs and may communicate with the other VMs, for example via an emulated network interface. The host, through a virtualization software (e.g., hypervisor) running therein, should be configured with adequate computational and memory resources to support the VMs.

As in physical machines, security measures are implemented in VMs to combat malicious activity, such as corrupting memory or accessing privileged information. VM introspection tools, implemented in VMs as guest drivers, may be used to inspect the contents of the VM in real-time, and as described in U.S. application Ser. No. 13/430,868 and U.S. application Ser. No. 14/550,881, both of which are incorporated by reference herein, monitor events within the VM, and selectively report system events to various service appliances, such as a security service appliance configured with anti-virus and anti-malware scanning software.

As such, guest introspection drivers are key components in the VM's security framework and need to be shielded from kernel-level attacks or malicious programs, such as root kits. The possible root kit attack vectors include attempts to unload the driver or prevent the driver from loading, tampering with the driver code or data that are on disk or in memory, and tampering with the communication channel of the driver.

DETAILED DESCRIPTION

According to one or more embodiments, the hypervisor provides the guest operating system with a plurality of protection domains, including a root protection domain and one or more secure protection domains, and mechanisms for controlling the transitions between protection domains. The guest physical memory region of a secure protection domain, which is mapped to host physical memory by secure nested page tables, stores secure guest code (e.g., guest introspection driver code) and data, and guest page tables for the secure guest code. When executing secure guest code, the guest page tables stored in the secure protection domain region are used for guest virtual to guest physical address translations, and the secure nested page tables are used for guest physical to host physical address translations.

In the embodiments described herein, page tables are employed to enable access to memory regions of different protection domains and set restrictions for accessing them. In alternative embodiments, constructs other than page tables may be employed so long as they provide mapping between address spaces and allow for setting restrictions on the ways in which memory at different locations can be accessed.

Figure 1:
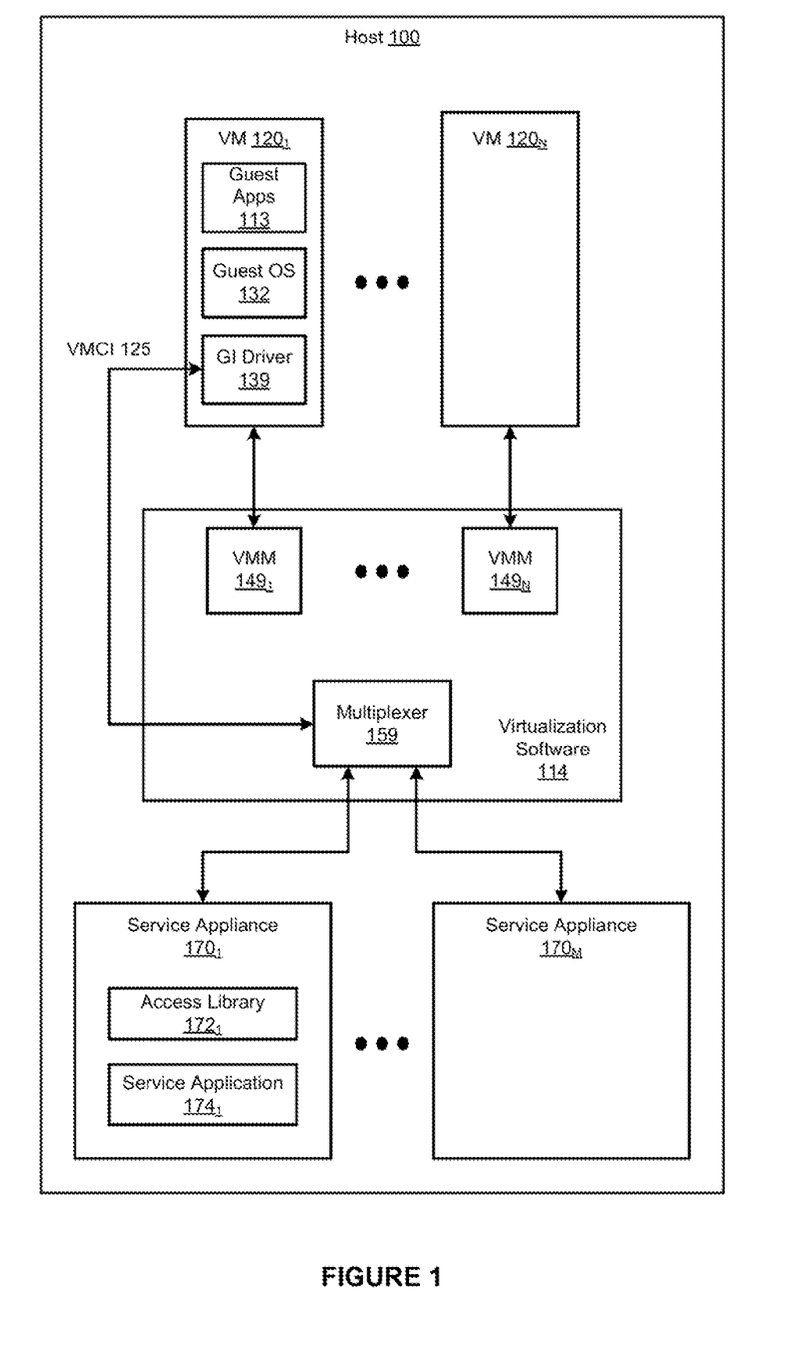
FIG. 1 is a block diagram of a virtualized host server system that implements a plurality of protection domains according to embodiments.

FIG. 1 is a block diagram of a virtualized host server system that implements a secure protection domain for a secure guest code and data, e.g., guest introspection driver code and data, according to embodiments. In FIG. 1, the virtualized host server system is depicted as host 100. Host 100 is built on an underlying hardware computing platform comprising one or more computer systems, each of which may be a desktop computer, laptop computer, tablet computer, mobile device such as a smart phone, server grade computer system, or any other suitable hardware computing platform, including systems based on different variations of the well-known ARM or x86 architecture platforms. Host 100 is configured to execute virtualization software 114 that provides execution support for one or more guest virtual machines (VMs) 120. Service appliances 170 are depicted in FIG. 1 for illustrative purposes and may be implemented to provide services such as anti-virus and anti-malware scanning, data loss prevention, and file integrity.

Each VM 120 is configured to execute a guest operating system (OS) 132, which may be a commodity operating system, such as Microsoft Windows® operating system or Linux® operating system. Each VM 120 is further configured to support guest applications (apps) 113 and a guest introspection (GI) driver 139, further described in detail below, which monitor events within the VM, and selectively reports system event to service appliances 170.

Virtualization software 114 is configured to manage and operate host 100. Virtualization software 114 provides an execution environment for VMs 120 and service appliances 170. Each VM 120 and service appliance 170 executes as an application in an independent context, and virtualization software 114 provides a more privileged context that may be used as a bridge between these independent contexts. Virtualization software 114 may be implemented to include a kernel with hardware drivers for managing related hardware subsystems within host server system 100. In one embodiment, virtualization software 114 comprises a host operating system configured to provide system services to VMs 120. In other embodiments, virtualization software 114 comprises a hypervisor configured to provide certain system services to VMs 120. The hardware subsystems may include, without limitation, computational resources including one or more processing units (e.g., CPUs) and system memory (referred to herein as "host physical memory," which is 202 in FIG. 2), mass storage, a networking in interface, input/output interfaces, a display controller, and power management functions.

As shown, virtualization software 114 includes virtual machine monitors (VMMs) 149, which operate in the privileged context of virtualization software 114 and provide the virtual system support, such as emulated physical devices (e.g., virtual CPUs and virtual system memory), for their respective VMs. In alternative embodiments, there may be one VMM for a plurality of VMs, or there may be a plurality of VMMs, one for each VM. In the embodiments described herein, VMM 149 is notified when GI driver 139 is loaded in the corresponding VM. Upon receiving the notification, VMM 149 performs a signature verification to verify the authenticity of GI driver 139, in particular the executable code and data of GI driver 139 when they are loaded into memory. Details of the signature verification that is carried out are described below in conjunction with FIG. 3. The purpose of the signature verification is to make sure that the executable code and data of GI driver 139 are the same as when they were created and that they have not been modified in any way by a malicious program.

Virtualization software 114 further includes a multiplexer 159 which operates in the privileged context of virtualization software 114. Multiplexer 159 exchanges data messages with at least one GI driver 139 and at least one service appliance 170. In one embodiment, multiplexer 159 communicates with GI driver 139 over a communication interface known as VMCI (virtual machine communication interface, which implements a shared memory communication mechanism with a socket application interface) 125. When multiplexer 159 receives the data message, an associated destination address is matched to an entry within the forwarding table to determine a destination GI driver 139 or service appliance 170 for the data message. It should be recognized that other types of communication interfaces may be used in alternative embodiments.

Each service appliance 170 includes software service application 174 and an access library 172. A given service appliance 170 may execute as an application under control of virtualization software 114, and may be implemented as a virtual machine with a guest OS that is configured to execute service application 174. In some embodiments, service applications 174 that implement security services may execute as applications under the control of virtualization software 114, and are implemented in a single virtual machine, known as a "security virtual machine." Access library 172 is configured so as to communicate with at least one GI driver 139 via the multiplexer 159. In one embodiment, access library 172 opens a different socket connection, for example via TCP/IP, to multiplexer 159 for communication with each different GI driver 139. In alternative embodiments, different message passing techniques may be implemented. For example, a shared memory message passing system may be implemented for communication between thin agents 139 and access libraries 172. In certain embodiments, service appliance $170_M$ is configured to execute on a remote host server system that is coupled to host server system 100 via a data network. In such embodiments, service appliance $170_M$ establishes data connections, such as TCP/IP connections, to one or more VMs 120 within host server system 100 and operates substantially identically to other service appliances 170. Similarly, service appliance $170_1$, executing within host server system 100, may connect to and provide services to VMs operating within the remote host server system.

Access library 172 presents an application programming interface (API) (not shown) to service application 174. The API includes service calls for communicating with at least one GI driver 139. Events that may be reported include file system events, process events, memory events, registry events, and user events. Exemplary file system events include opening a file, closing a file, writing a file, and modifying a file. Exemplary process scheduling events include mapping a file for execution, starting a process, and stopping a process. Certain types of events, such as registry events, may depend on a particular version of guest OS 132. The API may specify that certain events not be reported. For example, service application 174 may request that no events be reported, or that only specific events be reported.

In this fashion, access library 172 and GI driver 139 operate in concert to provide service application 174 with access to system resources for associated guest OS 132. In some embodiments, GI driver 139 and service application 174 share a security key used to encrypt/decrypt data packets that are communicated between GI driver 139 and service application 174 via multiplexer 159 and access library 172. In such embodiments, the security of the communications is limited by the confidentiality of the security key. For this reason, the security key is stored in a secure protection domain region of the guest physical memory, which is an area of guest physical memory that is mapped for access by a secure code, such as GI driver 139. GI driver 139 retrieves the security key to encrypt data to be transmitted to multiplexer 159 and to decrypt data received from multiplexer 159.

The various terms, layers and categorizations used to describe the virtualization components in FIG. 1 may be referred to differently without departing from their functionality or the spirit or scope of the invention. One example of virtualization software 114 that may be used is a hypervisor included as component of VMware's vSphere® product, which is commercially available from VMware, Inc. of Palo Alto, Calif.

Figure 2:
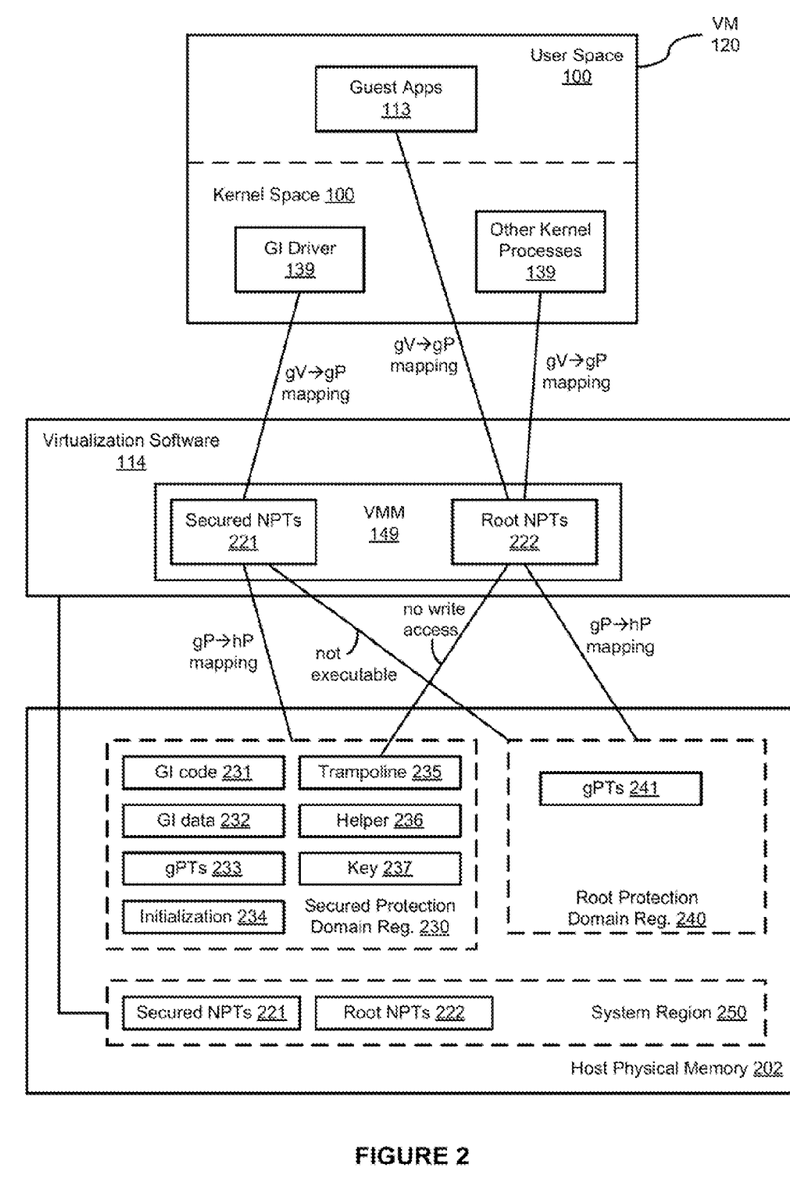
FIG. 2 is a schematic diagram that depicts memory mappings to the different protection domains according to embodiments.

FIG. 2 is a schematic diagram of memory mappings employed in the embodiments to isolate a secure protection domain from the root protection domain. In FIG. 2, multiple memory mappings are shown but they can be divided into two types. The first type, labeled as gV→gP mapping, is a mapping from the guest virtual memory space to the guest physical memory space. The gV→gP mapping is managed by guest OS 132 and is encoded in guest page tables (gPTs). As in physical computer systems, the guest page tables are provided per process in the embodiments. The second type, labeled as gP→hP mapping, is a mapping from the guest physical memory space to the host physical memory space. The gP→hP mapping is managed by virtualization software 114, in particular VMM 149, and is encoded in nested page tables (NPTs) (also known as "extended page tables"). Conventionally, one set of nested page tables is provided per VM. In the embodiments, however, two sets are provided. They are referred to herein as secure nested page tables (NPTs) 221 and root nested page tables (NPTs) 222. Secure NPTs 221 map guest physical memory addresses to a secure protection domain region 230 of host physical memory 202.

Root NPTs 222 map guest physical memory addresses to a root protection domain region 240 of host physical memory 202. Another region 250 in host physical memory 202 is reserved for use by virtualization software 114 to enable virtualization software 114 to carry out system functions such as memory mapping functions. The secure NPTs 221 and root NPTs 222 are stored in this region 250. The remaining regions of host physical memory 202 may be free or used to map host physical memory required by other VMs or processes running in host 100. It should recognized that the boxes depicting secure protection domain region 230, root protection domain region 240, and system region 250 are for illustrative purposes only, and that they may be of any size and need not be contiguous in the host physical memory space.

In the embodiments, the executable code and data of GI driver 139 are stored in secure protection domain region 230, and identified in FIG. 2 and hereinafter as GI code 231 and GI data 232, respectively. Other items stored in secure protection domain region 230 include guest page tables of GI driver (gPTs 233), initialization code 234, which is executed upon loading of GI code 231 into memory, trampoline code 235, which is called when entering into or exiting out of the secure protection domain, a helper function code 236, which is called during execution in the secure protection domain to retrieve data from root protection domain region 240 without exiting out of the secure protection domain assuming that the helper function has access to the guest page tables, and a security key 237, which is used to encrypt/decrypt data during communication over VMCI 125.

The conceptual diagram depicted in FIG. 2 illustrates a simplified embodiment where one virtual CPU for VM 120 is executing in the secure protection domain or the root protection domain. However, in the embodiments, multiple virtual CPUs support execution of VM 120, and one or more virtual CPUs may be executing in the secure protection domain while one or more other virtual CPUs are executing in the root protection domain.

Figure 3:
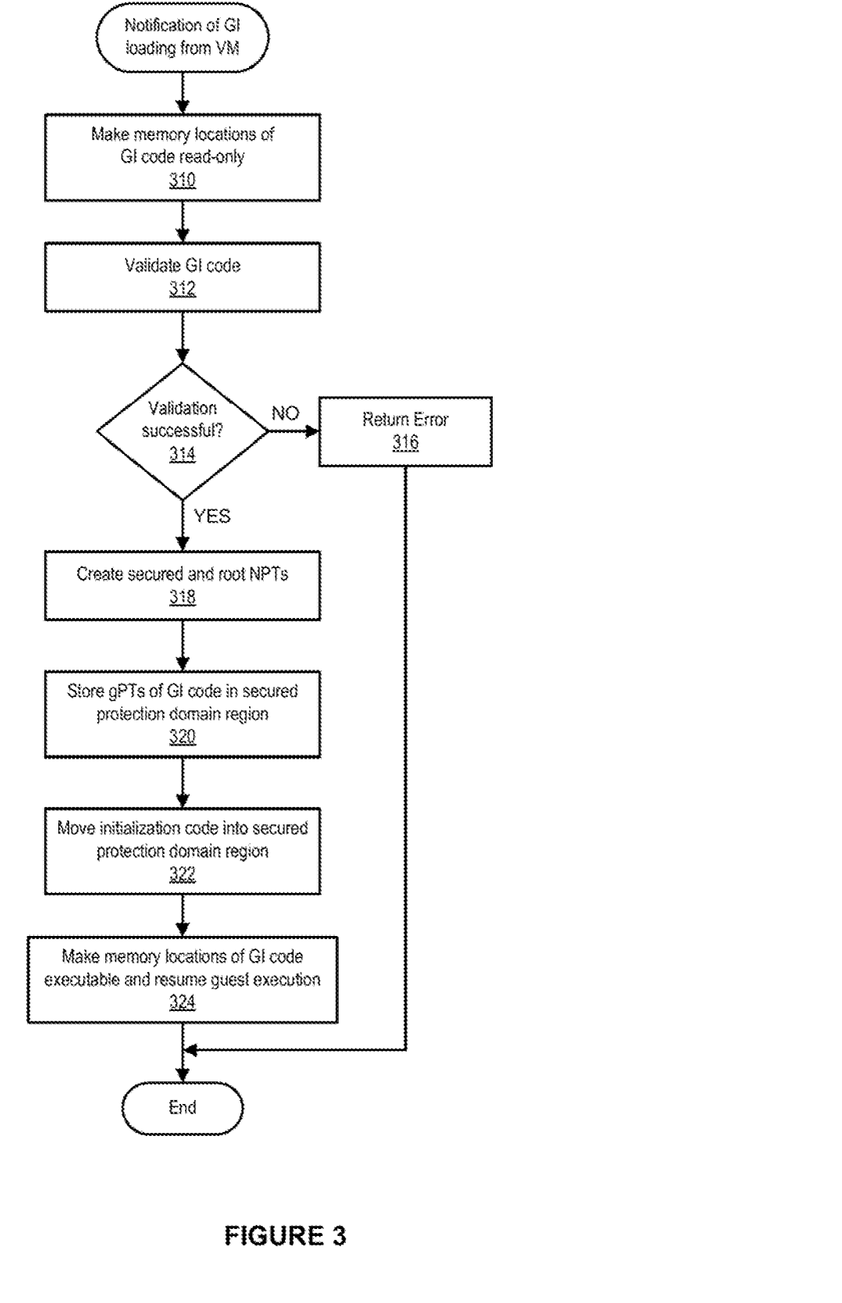
FIG. 3 depicts a flow diagram of method steps for creating a secure protection domain when secure guest code and data are loaded into memory, according to an embodiment.

FIG. 3 depicts a flow diagram of method steps for initializing the secure protection domain when the secure guest code and data loaded into memory, according to an embodiment. These steps are carried out by VMM 149 when it is notified through a hypercall that GI driver 139 has been loaded into guest physical memory of VM 120. The hypercall includes parameters that identify guest virtual addresses of the executable code and data regions of GI driver 139. Upon receiving this notification, at step 310, VMM 149 marks the page table entries of the memory locations that store the code and data of GI driver 139 to be read-only, so that no other guest thread running on other virtual CPUs can modify the memory state of the executable code and data regions of GI driver 139. Then, at step 312, VMM 149 issues a request to a service appliance 170 through multiplexer 159 to validate the executable code and data regions of GI driver 139 by comparing them against known valid signatures. Any technically feasible method may be used for the validation so long as the validation is orchestrated outside the guest because a rogue agent may attempt to disable any such validation within the guest. In one embodiment, a hashed valid version of the executable code and data regions of GI driver 139 is decrypted using a public key of the creator of GI driver 139 and compared against the in-memory image of the executable code and data regions of GI driver 139. If the validation at step 314 is not successful, VMM 149 returns an error at step 316 and the initialization process terminates without GI driver 139 being successfully loaded.

On the other hand, if the validation at step 314 is successful, at step 318, secure NPTs 221 and root NPTs 222 are created from original NPTs that provided a complete mapping from the guest physical memory to the host physical memory. In particular, the mappings of guest physical memory addresses corresponding to the executable code and data regions of GI driver 139 are moved into the secure NPTs 221 and the other mappings are moved into the root NPTs 222. In addition, at step 320, secure guest page tables are created from original guest page tables and stored in secure protection domain region 230. In particular, the original guest page table entries that point to guest physical memory pages that are mapped by secure NPTs 221 to secure protection domain region 230 are moved into secure guest page tables, shown in FIG. 2 as gPTs 233. It should be recognized that the creation of secure guest page tables and storing them in secure protection domain region 230 prevents a rogue agent from changing the mapping of a guest virtual memory address that points to a guest physical memory address that is mapped in secure NPTs 221.

Optionally, at step 322, the initialization code may be moved into secure protection domain region 230. This allows guest execution to remain in the secure protection domain after step 324, where VMM 149 marks the page table entries of the memory locations that store the code of GI driver 139 to be executable and the page table entries of the memory locations that store data of GI driver 139 to be read/write-able. Any guest OS API calls made during initialization are handled in the same way an interrupt is handled as described below in conjunction with FIG. 5A. In addition, a return from a guest OS API call is handled in the same way as an interrupt return is handled as described below in conjunction with FIG. 5B. In addition, in steps 310 and 324, instead of changing the access restrictions of the memory locations that store the code and data of GI driver 139, VMM 149 may pause all virtual CPUs managed thereby at step 310 and release them at step 324.

It should be recognized that all data that are stored in secure protection domain region 230 are not mapped in the root protection domain and are only accessible to code executing in the secure protection domain such as GI driver 139. As such, confidential information can be stored in secure protection domain region 230 without any risk of being exposed even if guest OS 132 is compromised. One example of such confidential information is the security key that is used to encrypt and decrypt data communicated over VMCI 125.

Figure 4A:
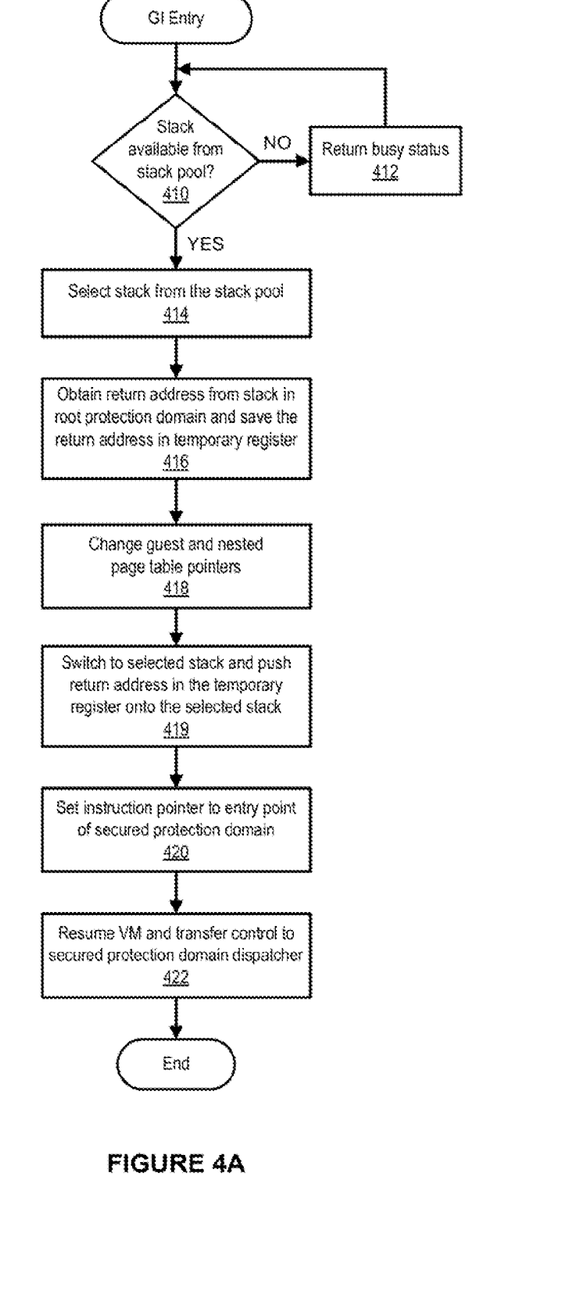
FIGS. 4A and 4B depict flow diagrams of method steps for entering and exiting the secure protection domain, according to an embodiment.
Figure 4B:
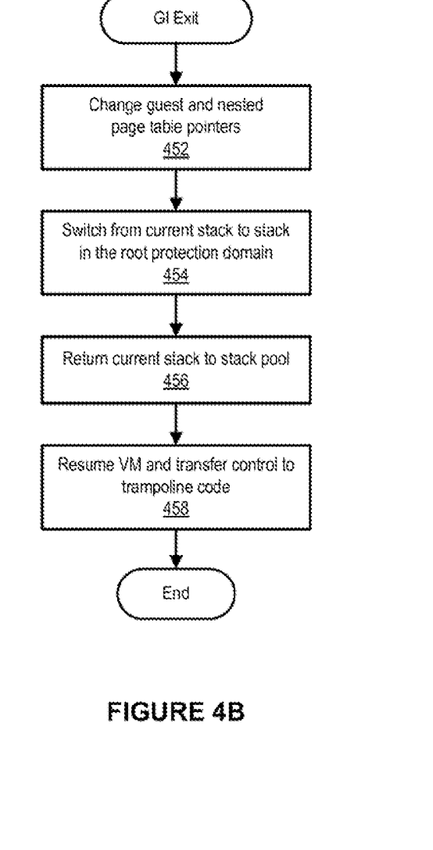

FIGS. 4A and 4B depict flow diagrams of method steps for entering and exiting a secure protection domain, according to an embodiment. The steps of FIG. 4A are carried out by VMM 149 when guest OS 132 calls into trampoline code 235, which is stored in secure protection domain region 230 but is mapped executable (but not writable) from a root protection domain, and causes trampoline code 235 to perform a hyperjump into the secure protection domain (i.e., enter the secure protection domain) with an entry number passed as a parameter. The steps of FIG. 4B are carried out by VMM 149 when GI driver 139 calls into trampoline code 235 and causes trampoline code 235 to perform a hyperjump out of the secure protection domain (i.e., exit the secure protection domain).

The method of FIG. 4A begins at step 410, where VMM 149 determines whether or not there is an available secure thread stack from a secure thread stack pool. If not, VMM 149 returns a busy status to trampoline code 235 and step 410 is repeated periodically until a secure thread stack becomes available. If there is an available secure thread stack or when a secure thread stack becomes available, VMM 149 at step 414 selects a secure thread stack. Then, at step 416, VMM 149 obtains the return address from the instruction pointer in the root protection domain and saves the return address in a temporary register. At step 418, VMM 149 changes the pointer (GPT) to the guest page tables (currently pointing to gPTs 241 stored in a root protection domain region 240), and the NPT pointer, which is the pointer to the nested page tables (currently pointing to root NPTs 222), so that the guest page table pointer GPT points to gPTs 233 stored in secure protection domain region 230 and the NPT pointer points to secure NPTs 221. After the page table pointers have been changed, VMM 149 at step 419 switches the stack to the selected secure thread stack and pushes the return address in the temporary register onto the selected stack. The VMM 149 then sets the instruction pointer to an entry point to the secure protection domain at step 420, and resumes guest execution at step 422, as a result of which execution control is transferred to a secure protection domain dispatcher. The secure protection domain dispatcher performs a validation of the entry number and, if the entry number is validated, allows execution of GI driver 139 in the secure protection domain. Validation of the entry number consists of a check that the entry number corresponds to a defined service. In one embodiment, defined services range from 0 to n, and the validation consists of checking that the entry number lies between 0 and n. Dispatch can be done through a jump table, binary decision tree, or other mechanism that transfers control flow from the dispatch routine to the code associated with the indicated service.

The steps of FIG. 4B are executed when GI driver 139 calls into trampoline code 235 and causes trampoline code 235 to perform a hyperjump out of the secure protection domain. At step 450, VMM 149 pops the return address from the stack and saves the return address in a temporary register. Then, at step 452, VMM 149 changes the guest page table pointer GPT and the NPT pointer, so that the guest page table pointer points to gPTs 241 and the NPT pointer points to root NPTs 222. After the page table pointers have been changed, VMM 149 switches the stack back to the thread stack in the root protection domain at step 454 and returns the current secure thread stack back to the secure thread stack pool at step 456. At step 458, the VMM sets the instruction pointer to the return address stored in a temporary register and resumes guest execution in the root protection domain.

Figure 5A:
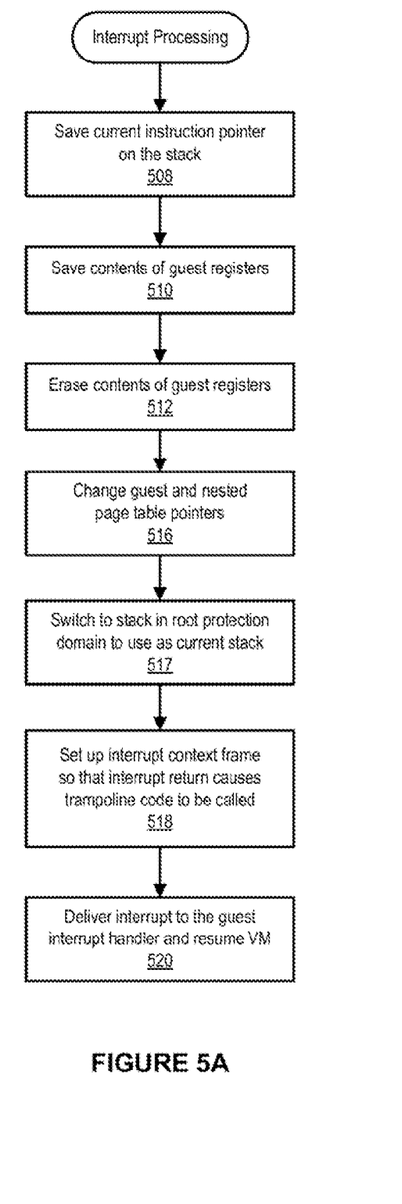
FIGS. 5A and 5B depict flow diagrams of method steps for handling interrupts from within the secure protection domain and resuming execution in the secure protection domain after an interrupt return, according to an embodiment.
Figure 5B:
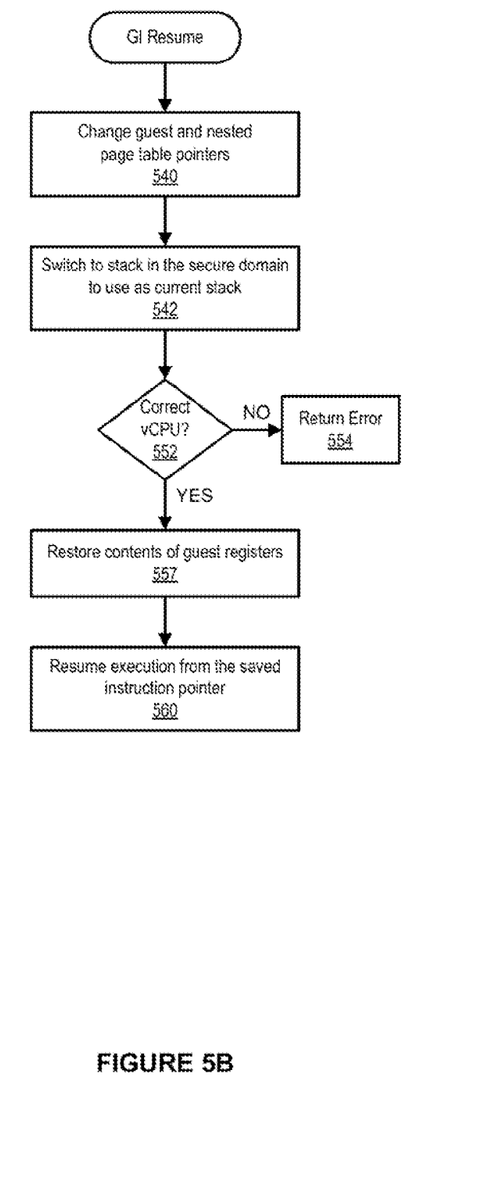

FIGS. 5A and 5B depict flow diagrams of method steps for handling interrupts from within a secure protection domain and resuming execution in the secure protection domain after an interrupt return, according to an embodiment. As used herein, "interrupts" include exceptions, maskable external interrupts, non-maskable interrupts, instruction breakpoints, data breakpoints, single-steps, and any similar constructs that interrupt the normal execution flow. The steps of FIG. 5A are carried out by VMM 149 when an interrupt is detected during execution of GI driver 139. The steps of FIG. 5B are carried out by VMM 149 upon a return from interrupt handling.

At step 508, VMM 149 pushes the current instruction pointer onto the stack so that it can resume from that point after the interrupt is handled. At step 510, VMM 149 saves into host physical memory, e.g., into system region 250, the contents of the registers of the virtual CPU in which GI driver 139 is executing. Then, at step 512, VMM 149 erases the contents of the registers, including the stack pointer, so that, when the interrupt is processed in the root protection domain, confidential information which the registers may contain will not be made available for reading by a rogue agent if the guest OS has been compromised. At step 516, VMM 149 changes the guest page table pointer and the NPT pointer, so that the guest page table pointer points to gPTs 241 and the NPT pointer points to root NPTs 222. At step 517, the VMM 149 obtains the root protected domain thread stack to use as the current stack. Then, VMM 149 sets up the interrupt context frame at step 518, so that an interrupt return (IRET) causes trampoline code 235 to be called and perform a hyperjump to resume execution of GI driver 139, and delivers the interrupt to the guest interrupt handler while resuming guest execution at step 520.

After the interrupt is handled within the guest in the root protection domain, interrupt return is processed. According to the interrupt context frame that was set up at step 518, interrupt return causes trampoline code 235 to be called and perform a hyperjump to resume execution of GI driver 139. At step 540, the VMM 149 changes the guest page table pointer and the NPT pointer, so that the guest page table pointer points to gPTs 233 and the NPT pointer points to secure NPTs 221. At step 542, the VMM 149 obtains the stack pointer to the previously selected secure thread stack in the secure domain and switches to that stack to use as the current stack. VMM 149 restores contents of the registers of the virtual CPU at step 557. Then, at step 560, execution of GI driver 139 is resumed in the virtual CPU from the instruction pointer that is popped from the stack.

Figure 6:
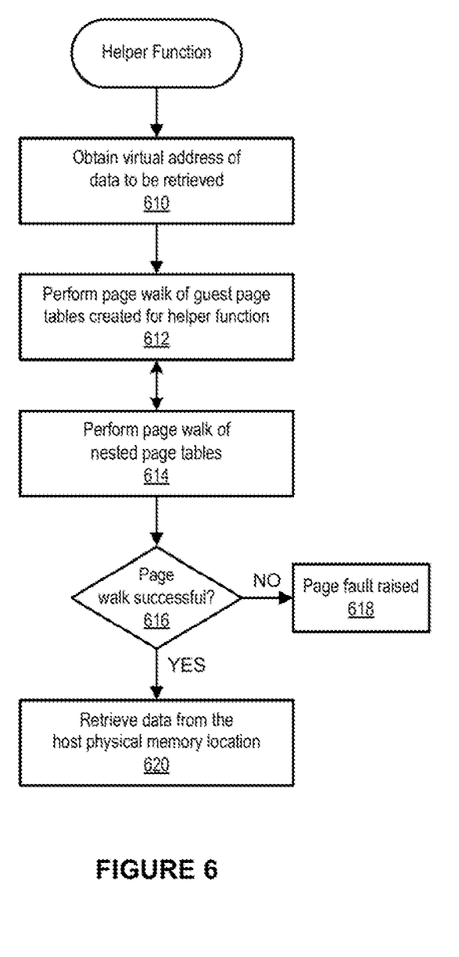
FIG. 6 depicts a flow diagram of method steps for accessing data in a root protection domain from the secure protection domain, according to an embodiment.

FIG. 6 depicts a flow diagram of method steps for accessing data in a root protection domain from the secure protection domain, according to an embodiment. In this embodiment, in order to permit the helper function which is called in the secure protection domain (i.e., while the NPT pointer is pointing to secure NPTs 221), secure NPTs 221 are modified to include mappings to root protection domain region 240. However, these mappings are mapped non-executable so that non-secure code is not executed while the code and the data in secure protection domain region 230 are mapped and thus visible. In addition, gPTs 233 are modified to include guest virtual to guest physical mappings to entries added to secure NPTs 221.

At step 610, the helper function parses the function call to obtain the virtual address of the data to be retrieved. Then, at steps 612 and 614, modified gPTs 233 and modified secure NPTs 221 are walked to obtain a host physical memory page of the data to be retrieved. If such a host physical memory pure exists as determined from a successful pare walk (step 616), the helper function retrieves the data from that host physical memory address (step 620). If the page walk was not successful, an error is returned or if available, corrective action taken (step 618).

Figure 7:
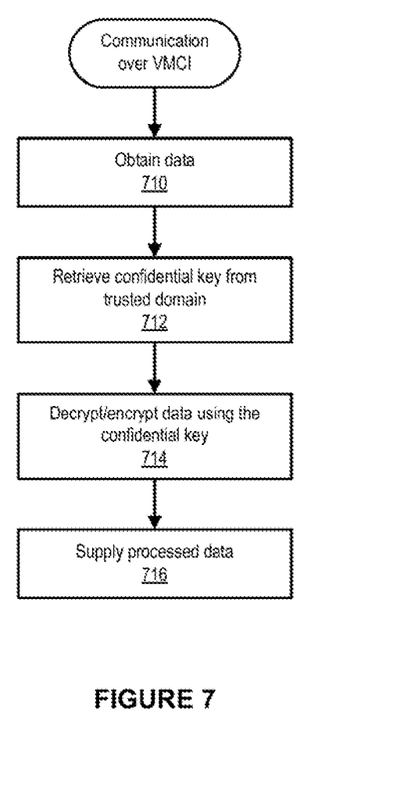
FIG. 7 depicts a flow diagram of method steps for transmitting data from and to the secure protection domain over a communications channel, according to an embodiment.

FIG. 7 depicts a flow diagram of method steps for transmitting data from and to the secure protection domain over a communications channel, according to an embodiment. The method steps of FIG. 7 depict steps carried out by GI driver 139 to encrypt data before it supplies the data to multiplexer 159 over VMCI 125 and to decrypt data received from multiplexer 159 over VMCI 125 before it supplies the data to guest OS 132.

At step 710, GI driver 139 obtains the data to be processed from either guest OS 132, or from multiplexer 159 over VMCI 125. Then, at step 712, GI driver 139 retrieves security key 237 from secure protection domain region 230. With security key 237, GI driver 139 encrypts the data obtained from guest OS 132 for supplying the data to multiplexer 159 over VMCI 125 in encrypted form, or decrypts the data received from multiplexer 159 over VMCI 125 for sending the data to guest OS 132 in unencrypted form. At step 716, GI driver supplies the encrypted data to multiplexer 159 over VMCI 125 or the decrypted data to guest OS 132.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of isolating secure guest code to be executed in a guest that is configured in a host by a virtualization software, comprising:
creating first page tables, which are used for guest physical to host physical address translations, that provide mappings to a first protected region of host physical memory where the secure guest code has been loaded;

creating second page tables, which are used for guest physical to host physical address translations, that provide mappings to a second protected region of the host physical memory;
storing third page tables, which are used for guest virtual to guest physical address translations, in the first protected region;
storing fourth page tables, which are used for guest virtual to guest physical address translations, in the second protected region; and
when execution is switched from a non-secure guest code, which is loaded into the second protected region, to the secure guest code, changing a first pointer value from one that points to the fourth page tables to one that points to the third page tables so that the third page tables are accessed for guest virtual to guest physical address translations, and changing a second pointer value from one that points to the second page tables to one that points to the first page tables so that the first page tables are accessed for guest physical to host physical address translations.

2. The method of claim 1, wherein the first page tables include a mapping to a trampoline code that causes the execution switch from the non-secure guest code to the secure guest code when the trampoline code is called while the non-secure guest code is being executed, and the second page tables also include a mapping to the trampoline code.

3. The method of claim 2, wherein the mapping to the trampoline code included in the second page tables has a control bit that prohibits writing to the host physical memory location into which the trampoline code has been loaded.

4. The method of claim 2, further comprising:
detecting an interrupt while executing the secure guest code;
saving contents of guest registers and then clearing the contents of the guest registers;
switching to the fourth page tables for guest virtual to guest physical address translations, and to the second page tables for guest physical to host physical address translations;
delivering the interrupt to an interrupt handler in the guest; and
after the interrupt handler completes execution, calling into the trampoline code to cause the execution switch back to the secure guest code.

5. The method of claim 1, wherein the first page tables also include non-executable mappings to the second protected region.

6. The method of claim 5, wherein the first page tables include a mapping to a helper function, and the helper function is invoked to access the host physical memory locations of the second protected region during execution of the secure guest code.

7. The method of claim 1, wherein the first page tables further include a mapping to confidential data.

8. The method of claim 7, wherein the confidential data is used as a cryptographic key for decrypting and encrypting data transmitted between the secure guest code and a module within the virtualization software.

9. The method of claim 1, further comprising:
performing signature verification on the secure guest code upon being notified that the secure guest code has been loaded into the host physical memory.

10. A non-transitory computer readable medium comprising instructions to be executed in a host including one or more processors and host physical memory to carry out a method of isolating secure guest code to be executed in a guest that is configured in the host by a virtualization software, said method comprising:
creating first page tables, which are used for guest physical to host physical address translations, that provide mappings to a first protected region of host physical memory where the secure guest code has been loaded;
creating second page tables, which are used for guest physical to host physical address translations, that provide mappings to a second protected region of the host physical memory that is distinct from the first protected region of the host physical memory;
storing third page tables, which are used for guest virtual to guest physical address translations, in the first protected region;
storing fourth page tables, which are used for guest virtual to guest physical address translations, in the second protected region; and
when execution is switched from a non-secure guest code, which is loaded into the second protected region, to the secure guest code, changing a first pointer value from one that points to the fourth page tables to one that points to the third page tables so that the third page tables are accessed for guest virtual to guest physical address translations, and changing a second pointer value from one that points to the second page tables to one that points to the first page tables so that the first page tables are accessed for guest physical to host physical address translations.

11. The non-transitory computer readable medium of claim 10, wherein the first page tables include a mapping to a trampoline code that causes the execution switch from the non-secure guest code to the secure guest code when the trampoline code is called while the non-secure guest code is being executed, and the second page tables also include a mapping to the trampoline code.

12. The non-transitory computer readable medium of claim 11, wherein the mapping to the trampoline code included in the second page tables has a control bit that prohibits writing to the host physical memory location into which the trampoline code has been loaded.

13. The non-transitory computer readable medium of claim 11, wherein the method further comprises:
detecting an interrupt while executing the secure guest code;
saving contents of guest registers and then clearing the contents of the guest registers;
switching to the fourth page tables for guest virtual to guest physical address translations, and to the second page tables for guest physical to host physical address translations;
delivering the interrupt to an interrupt handler in the guest; and
after the interrupt handler completes execution, calling into the trampoline code to cause the execution switch back to the secure guest code.

14. The non-transitory computer readable medium of claim 10, wherein the first page tables also include non-executable mappings to the second protected region.

15. The non-transitory computer readable medium of claim 14, wherein the first page tables include a mapping to a helper function, and the helper function is invoked to access the host physical memory locations of the second protected region during execution of the secure guest code.

16. The non-transitory computer readable medium of claim 10, wherein the first page tables further include a mapping to confidential data.

17. The non-transitory computer readable medium of claim 16, wherein the confidential data is used as a cryptographic key for decrypting and encrypting data transmitted between the secure guest code and a module within the virtualization software.

18. The non-transitory computer readable medium of claim 10, wherein the method further comprises:
performing signature verification on the secure guest code upon being notified that the secure guest code has been loaded into the host physical memory.

19. A host including one or more processors and host physical memory, and having a virtualization software installed therein to carry out a method of isolating secure guest code to be executed in a guest configured by the virtualization software, said method comprising:
creating first page tables, which are used for guest physical to host physical address translations, that provide mappings to a first protected region of host physical memory where the secure guest code has been loaded;
creating second page tables, which are used for guest physical to host physical address translations, that provide mappings to a second protected region of the host physical memory that is distinct from the first protected region of the host physical memory;
storing third page tables, which are used for guest virtual to guest physical address translations, in the first protected region;
storing fourth page tables, which are used for guest virtual to guest physical address translations, in the second protected region; and
when execution is switched from a non-secure guest code, which is loaded into the second protected region, to the secure guest code, changing a first pointer value from one that points to the fourth page tables to one that points to the third page tables so that the third page tables are accessed for guest virtual to guest physical address translations, and changing a second pointer value from one that points to the second page tables to one that points to the first page tables so that the first page tables are accessed for guest physical to host physical address translations.

20. The host of claim 19, wherein the method further comprises:
performing signature verification on the secure guest code upon being notified that the secure guest code has been loaded into the host physical memory.

* * * * *